(12) United States Patent
Lundholm et al.

(10) Patent No.: US 9,941,732 B2
(45) Date of Patent: Apr. 10, 2018

(54) CONTROLLING CHARGING AND/OR DISCHARGING OF BATTERIES WITHIN A USER DEVICE

(71) Applicant: MOTOROLA MOBILITY LLC, Chicago, IL (US)

(72) Inventors: Andrew S. Lundholm, Hoffman Estates, IL (US); Martin R. Pais, North Barrington, IL (US)

(73) Assignee: Motorola Mobility LLC, Chicago, IL (US)

( * ) Notice: Subject to any disclaimer, the term of this patent is extended or adjusted under 35 U.S.C. 154(b) by 256 days.

(21) Appl. No.: 14/805,492

(22) Filed: Jul. 22, 2015

(65) Prior Publication Data
US 2017/0025869 A1 Jan. 26, 2017

(51) Int. Cl.
*H02J 7/16* (2006.01)
*H02J 7/04* (2006.01)
*H02J 7/00* (2006.01)

(52) U.S. Cl.
CPC ............ *H02J 7/047* (2013.01); *H02J 7/0013* (2013.01); *H02J 2007/005* (2013.01)

(58) Field of Classification Search
USPC ....................................................... 320/150
See application file for complete search history.

(56) References Cited

U.S. PATENT DOCUMENTS

2011/0309681 A1* 12/2011 Kamijima ............. H02J 7/0013
307/66
2014/0035513 A1* 2/2014 Kroenke ............... H02J 7/0021
320/107

* cited by examiner

Primary Examiner — Robert Grant
(74) Attorney, Agent, or Firm — Matthew C. Loppnow; The Watson I.P. Group PLC

(57) ABSTRACT

A user device can include a first battery to power the user device, a second battery to power the user device, and a switching logic controller. The switching logic controller can be configured to at least one of control simultaneous charging of the first and second batteries based on a temperature of at least one of the first and second batteries and control individual discharging of the first and second batteries based on the temperature of at least one of the first and second batteries.

20 Claims, 4 Drawing Sheets

CONTROLLING CHARGING AND/OR DISCHARGING OF BATTERIES WITHIN A USER DEVICE

BACKGROUND

1. Field

The present disclosure is directed to a method and apparatus for controlling charging and/or discharging of a plurality of batteries within a user device. More particularly, the present disclosure is directed to controlling individual charging and/or controlling simultaneous discharging of the plurality of batteries based on a temperature of one or more of the plurality of batteries.

2. Introduction

Presently, customers carry user devices so as to be able to use them to communicate. The scenarios of use of such user devices are varied, and their use in extreme hot or extreme cold weather exposure imposes limitations on an ability of a battery to power the user device.

In particular, if a battery of the user device is allowed to cool down below a certain temperature, internal chemistry (reaction rate) of the battery becomes sluggish, resulting in low energy delivery and/or high charge transfer impedance. Such battery issues become more pronounced in an older aged battery. For example, a lithium-ion (Li-ion) battery can provide approximately 10-15% power at 0.2 degrees centigrade when new. However, as the Li-ion battery ages, the power that can be produced reduces.

An amount of power a battery can produce eventually reduces enough to the point at which the battery cannot generate sufficient power to power up and run the user device. Such a reduction is particularly a problem when the battery becomes too cold and the user device is being used for an emergency phone call. Such a reduced state can even occur when the battery is in a fully charged state and becomes too cold. In other scenarios, increased battery impedance at cold temperatures, combined with high peak currents and a low state of charge, induces a voltage dip below a threshold voltage. This voltage dip causes power management integrated circuitry to shut down the user device when this voltage dip is detected. Furthermore, charging a battery below a certain temperature is deleterious to the health of the battery, leading to such problems as Li-plating that causes a drop in battery performance and in extreme cases leads to short-circuits.

Additionally, charging a battery generates heat. Too much heat in any one battery or portion of a battery pack, or cell, prematurely ages the battery and/or cell and decreases its expected life. Moreover, charging a battery in a user device that is already hot will introduce even more heat within the user device, potentially pushing electric components within the user device past a safe operating temperature.

Moreover, uniform self-heating under cold temperatures during charging and/or discharging of a battery is critical for battery health. Uniform self-heating does not occur for aged batteries, depending on battery usage history. In particular, aged batteries experience non-uniform current distribution among electrode layers that leads to non-uniform self-heating.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments can provide a method and apparatus that can allow for continued use of a user device at temperatures below a temperature that would otherwise leave a user device inoperative. Having a battery or cell within the battery fully charged and optimized for operation when temperatures fall below a temperature may be advantageous for operating the user device, especially in an emergency situation where operation of the user device may be critical.

Embodiments can provide a method and apparatus that can minimize heat generation during charging. Charging of an entire battery pack consisting of multiple batteries and/or cells may be advantageous to distribute the heat generated during the charging instead of allowing the generated heat to be concentrated in any one battery and/or cell. Furthermore, distribution of heat over a larger mass may also result in improved opportunities for thermal transfer to the surrounding area thereby minimizing heat buildup within the battery pack.

Embodiments can provide for a method and apparatus, such as a user device, comprising a first battery, a second battery, and a switching logic controller. The switching logic controller can be configured to at least one of control simultaneous charging of the first and second batteries based on a temperature of at least one of the first and second batteries and control individual discharging of the first and second batteries based on the temperature of at least one of the first and second batteries.

Embodiments can provide for a user device comprising a first battery configured to power the user device and a second battery configured to power the user device. The user device can further comprise a temperature sensor configured to sense a temperature of at least one of the first and the second batteries. The user device can further comprise a switching logic controller configured to control simultaneous charging of the first and the second batteries based on the temperature sensed by the temperature sensor and control individual discharging of the first and second batteries based on the temperature sensed by the temperature sensor.

Figure 1:
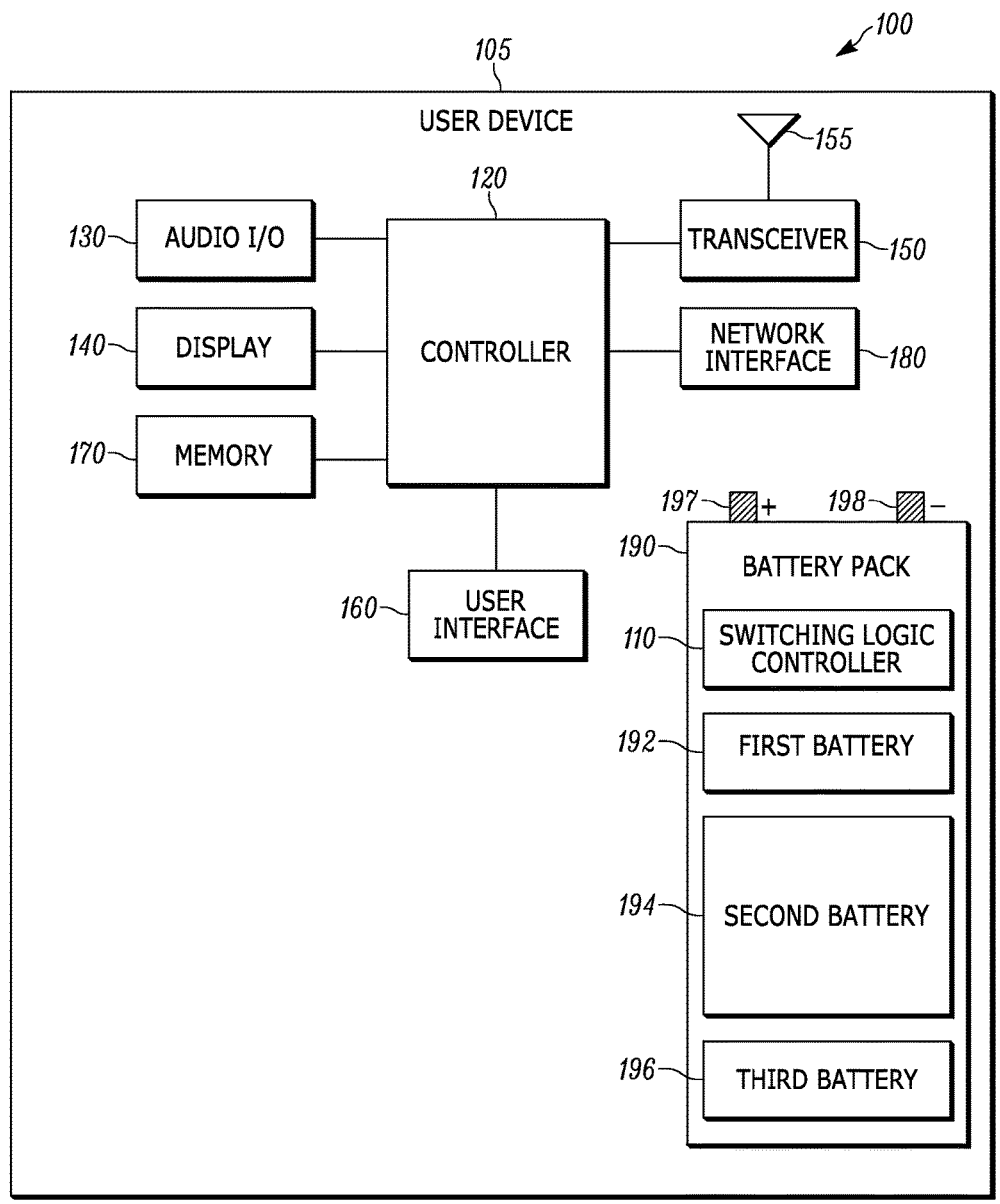
FIG. 1 illustrates a block diagram of an example user device, according to a possible embodiment.

FIG. 1 illustrates a block diagram of an example user device 100, according to a possible embodiment. The user device 100 can be a wireless terminal, a portable wireless communication device, a smartphone, a cellular telephone, a flip phone, a personal digital assistant, a personal computer, a tablet computer, or any other user device 100 that can experience temperatures that can inhibit the user device 100 from operating properly.

The user device 100 can include a housing 105, a controller 120 within the housing 105, audio input and output circuitry 130 coupled to the controller 120, a display 140 coupled to the controller 120, a transceiver 150 coupled to the controller 120, an antenna 155 coupled to the transceiver 150, a user interface 160 coupled to the controller 120, a memory 170 coupled to the controller 120, and a network interface 180 coupled to the controller 120. The user device 100 can further include a battery pack 190, where the battery pack 190 can include an anode terminal 197, a cathode terminal 198, a first battery 192, a second battery 194, and a third battery 196. The user device 100 can further include a switching logic controller 110 coupled to the battery pack 190 and the first, second and third batteries 192, 194, and 196. The switching logic controller 110 may reside on a separate circuit block from the electrical components 120, 130, 140, 150, 160, 170, and 180 of the user device 100. In at least one embodiment, the switching logic controller 110 may be either embedded within the battery pack 190 or located outside of the battery pack 190. The user device 100 can perform the methods described in all the embodiments.

The display 140 can be a viewfinder, a liquid crystal display (LCD), a light emitting diode (LED) display, a plasma display, a projection display, a touch screen, or any other device that displays information. The transceiver 150 can include a transmitter and/or a receiver. The audio input and output circuitry 130 can include a microphone, a speaker, a transducer, or any other audio input and output circuitry. The user interface 160 can include a keypad, a keyboard, buttons, a touch pad, a joystick, a touch screen display, another additional display, or any other device useful for providing an interface between a user and an electronic device. The network interface 180 can be a universal serial bus port, an Ethernet port, an infrared transmitter/receiver, an IEEE 1394 port, a WLAN transceiver, or any other interface that can connect an apparatus to a network or computer and that can transmit and receive data communication signals. The memory 170 can include a random access memory, a read only memory, an optical memory, a flash memory, a removable memory, a hard drive, a cache, or any other memory that can be coupled to the user device 100.

The user device 100 or the controller 120 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 170 or elsewhere on the user device 100. The user device 100 or the controller 120 may also use hardware to implement disclosed operations. For example, the controller 120 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 120 may be any controller or processor device or devices capable of operating an electronic device and implementing the disclosed embodiments.

The network interface 180 can be a wired communication interface, such as a universal serial bus interface, a serial wired interface, a parallel wired interface, an Ethernet interface, or other wired interface, can be an optical interface, such as an infrared interface, can be a wireless interface, such as a Bluetooth® interface, a Wi-Fi interface, a wireless local area network interface, a cellular network interface, a satellite network interface, a wireless wide area network interface, or can be any other interface or combination of interfaces.

The user device 100 can include a minimum of two independent batteries and/or cells to realize benefits of the embodiments disclosed herein. The configuration of batteries and/or cells within the user device 100 is dependent on, for example, the capacities of the batteries and/or cells, the power requirements of the user device 100, space limitations within the user device 100, or any other factors that can affect battery and/or cell selection. In the example embodiment, the user device 100 can include three batteries, the first, second, and third batteries 192, 194, and 196. The first, second, and third batteries 192, 194, and 196 can include one or more cells within each of the batteries. The first, second, and third batteries 192, 194, and 196 can be located in different regions of the user device 100. For example, the first, second, and third batteries 192, 194, and 196 can be modular, similar to a Secure Digital (SD) memory card, and inserted into slots around and/or within the user device 100 based on an anticipated climate of use for the user device 100.

The battery pack 190 can be coupled to the electrical components 110, 120, 130, 140, 150, 160, 170, and 180 of the user device 100. In operation, the battery pack 190 can provide operating power for the electrical components 110, 120, 130, 140, 150, 160, 170, and 180 of the user device 100. The battery pack 190 can be integrated with the user device 100 and non-removable. In an alternate embodiment, the battery pack 190 can be removable from the user device 100 allowing for replacement in event of a failure of the battery pack 190 or deteriorated performance of the battery pack 190. The battery pack 190 can include non-identical batteries and/or cells, for example batteries and/or cells consisting of various capacities, physical sizes (large or small), different chemistries, other non-identical cells, or can include identical batteries and/or cells. The charge and/or discharge rates of the first, second, and third batteries 192, 194, and 196 can be either equal or unequal. In at least one embodiment, the first, second, and third batteries 192, 194, and 196 can each form individual battery packs that can be coupled together to power the user device 100.

The first, second, and third batteries 192, 194, and 196 and/or one or more cells within the first, second, and third batteries 192, 194, and 196 can consist of various capacities, various physical sizes (large and/or small), one or more chemistries (for example, lead acid, Ni-MH, Ni-CAD, Li, Li-ion, and/or any other chemistry that can provide power to the user device 100), and/or one or more physical constructions (for example, button cell, cylindrical, rolled, prismatic, folded, and/or any other construction that may provide for packing considerations). For example, the first battery 192 can be constructed of a chemistry and/or a physical construction that is optimized to produce power for the user device 100 when a temperature of the first battery 192 falls below, for example, approximately 0° centigrade (C). The second battery 194 can be constructed of a chemistry and/or a physical construction that is optimized to produce power for the user device 100 within a range of most common normal operating temperatures, for example approximately between 0° C. and 45° C. The third battery 196 can be constructed of a chemistry and/or a physical construction that is optimized to produce power for the user device 100 when a temperature of the third battery 196 is above, for example approximately 45° C. Storage capacities of the first, second, and third batteries 192, 194, and 196 can be selected based on a projected operating temperatures. In the illustrated example, the first battery 192 and the third battery 196 can be of a smaller capacity than the second battery 194, the smaller capacity being reflective of times at which the first, second, and third batteries 192, 194, and 196 can experience normal, and cold and hot temperature extremes.

In one or more embodiments, one of the first battery 192 and the third battery 196 can be reserved as an emergency battery. The switching logic controller 110 can couple the emergency battery for discharge only when needed in an emergency situation.

Under normal operating temperatures, the switching logic controller 110 can couple the first, second, and third batteries 192, 194, and 196 in parallel or individually to power the user device 100. For example, the first, second, and third batteries 192, 194, and 196 can be either individually charged or charged in parallel when a temperature of the first, second, and/or third batteries 192, 194, and 196 is below the threshold hot temperature value. Coupling the first, second, and third batteries 192, 194, and 196 in parallel can allow the user device 100 to draw down the capacity of the first, second, and third batteries 192, 194, and 196 in unison. Charging and drawing down the capacity of the first, second, and third batteries 192, 194, and 196 in unison allows any heat caused by charging and discharge of the first, second, and third batteries 192, 194, and 196 to be distributed equally over a large volumetric mass.

In one or more embodiments, a user device 100 that is projected to be located in warmer parts of the country, such as the southern states, can exclude the first battery 192 that is optimized to power the user device 100 at temperatures below 0° C. Likewise, a user device 100 that is projected to be located in colder parts of the country, such as the northern states, can exclude the third battery 196 that is optimized to power the user device 100 at temperatures above 45° C.

The switching logic controller 110 can offer advantages during cold discharges and hot charging cycles. The switching logic controller 110 can control charging and/or discharging of the first, second, and third batteries 192, 194, and 196. The switching logic controller 110 can control a rate of charge and/or rate of discharge of the first, second, and third batteries 192, 194, and 196. The switching logic controller 110 can control individual discharging of the first, second and third batteries 192, 194, and 196 when a temperature of the first, second and/or third batteries 192, 194, and 196 is below the threshold cold temperature value. Discharging of a single battery from first, second and third batteries 192, 194, and 196 can maximize heat generation within this single battery.

The switching logic controller 110 can control charging and discharging of the first, second and third batteries 192, 194, and 196 to assure that such charging and discharging occur within a manufacturer rated specification for the first, second and third batteries 192, 194, and 196, based on chemistries of the first, second and third batteries 192, 194, and 196. For example, the switching logic controller 110 can prevent charging of the first, second and/or third batteries 192, 194, and/or 196 when a temperature of the first, second and/or third batteries 192, 194, and/or 196 rises above a 45° C. or drops below 0° C. Likewise, the switching logic controller 110 can prevent discharging of the first, second and/or third batteries 192, 194, and/or 196 when a temperature of the first, second and/or third batteries 192, 194, and/or 196 rises above 60° C. (70° C. in an emergency) or drops below −20° C. The switching logic controller 110 can prevent charging and discharging at temperatures that a manufacturer indicates can damage the first, second and/or third batteries 192, 194, and/or 196.

In at least one embodiment, the first battery 192 can be constructed with greater internal resistance than the second battery 194 and the third battery 196. The greater internal resistance can generate heat when the first battery 192 is discharged. The greater internal resistance can allow the first battery 192 to self-warm more quickly when subject to a load than the second battery 194 and the third battery 196. For example, the switching logic controller 110 can initially control discharge, for example, of the first battery 192 when a temperature of the first battery 192 falls below the threshold cold temperature value. Discharging a single battery, the first battery 192, when the first battery 192 is below the threshold cold temperature value, allows the first battery 192 to self-heat more quickly than if the first battery 192 were powering the user device 100 in parallel with the second battery 194 and/or the third battery 196. This self-heating of this singular battery can result in improved (lower) internal resistance should the battery be needed to provide further current. The second and third batteries 194 and 196 can remain non-discharged to provide power under normal operating temperatures or when the first battery 192 becomes depleted or substantially depleted. When the first battery 192 individually discharges to power the user device 100, the first battery 192 can provide thermal heat to at least one of the second and third batteries 194 and 196 by being in close proximity to the second and third batteries 194 and 196, bringing at least one of the second and third batteries 194 and 196 up to normal operating temperatures. When the first battery 192 is depleted or substantially depleted, the switching logic controller 110 can switchably de-couple the first battery 192 from discharging and switchably couple one or more of the second and third batteries 194 and 196 for discharge.

The switching logic controller 110 can control charging of the first, second and/or third batteries 192, 194, and 196. Under normal operating temperatures, the switching logic controller 110 can connect the first, second and/or third batteries 192, 194, and 196 either in parallel or individually for charging. The switching logic controller 110 can selectively connect the first, second and/or third batteries 192, 194, and 196 for charging to rated capacities, either individually or in parallel. Individually charging the first, second and/or third batteries 192, 194, and 196 can create unwanted heat within the user device 100, particularly when a temperature within the user device 100 is above the threshold hot temperature value. The switching logic controller 110 can control simultaneous charging of a minimum of two of the first, second and third batteries 192, 194, and 196 in parallel at a same time to reduce heat generated during charging when a temperature within the user device 100 is above the threshold hot temperature value. For example, at 3 amps charging the heat generation rate of a single battery will be high and this single battery will heat up quicker than if the current load is split to 1.5 amp for two batteries from the three of the first, second and third batteries 192, 194, and 196. Splitting the charging would distribute the heat over a larger physical mass for two batteries.

The switching logic controller 110 can control simultaneous charging of all three of the first, second and third batteries 192, 194, and 196 in parallel at a same time when a temperature within the user device 100 is above the threshold hot temperature value. Such simultaneous charging can distribute any heat generated during charging amongst a same large volumetric mass so as to slow an internal rate of temperature rise. Larger masses may include larger external surface areas allowing for larger thermal energy transfer to surrounding areas to keep battery temperatures lower.

Figure 2:
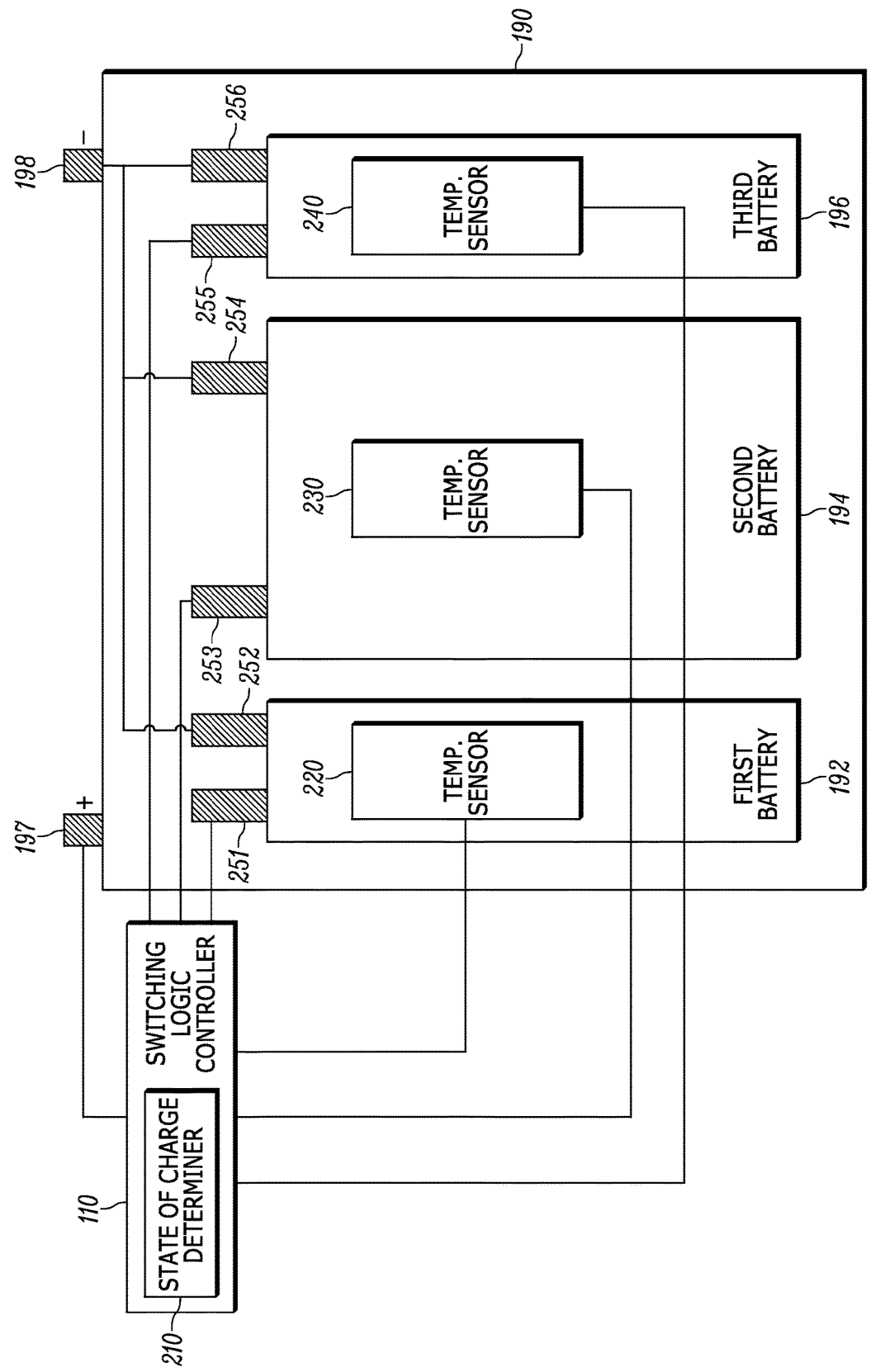
FIG. 2 illustrates a detailed view of an example battery pack shown in FIG. 1, according to a possible embodiment.

FIG. 2 illustrates a detailed view of the example battery pack 190 shown in FIG. 1, according to a possible embodiment. In particular, the switching logic controller 110 can be coupled to the first, second, and third temperature sensors 220, 230, and 240. The switching logic controller 110 can be configured to at least one of control simultaneous charging and/or control individual discharging based on one or more temperatures sensed by one or more of the temperature sensors 220, 230, and 240.

The switching logic controller 110 can be coupled to an anode 251 of the first battery 192, an anode 253 of the second battery 194, an anode 255 of the third battery 196, and an anode terminal 197 of the battery pack 190. The cathode terminal 198 of the battery pack 190 can be coupled to cathode terminals 252, 254, and 256 of the first, second and third batteries 192, 194, and 196, respectively. The switching logic controller 110 can be coupled to a state of charge determiner 210. The state of charge determiner 210 can either be integrated with the switching logic controller 110 or distinct from the switching logic controller 110.

The first, second, and third temperature sensors 220, 230, and 240 can sense a temperature of the first, second, and third batteries 192, 194, and 196, respectively. The first, second, and third temperature sensors 220, 230, and/or 240 can be located proximate to the first, second, and third batteries 192, 194, and 196, respectively, within the battery pack 190, outside of the battery pack 190, between cells of the first, second and/or third batteries 192, 194, and 196, and/or any other location that allows sensing of temperatures that can be used as a basis for controlling charging and/or discharging of the first, second, and third batteries 192, 194, and 196. The first, second, and third temperature sensors 220, 230, and/or 240 can be located in different regions of the user device 100. For example, the first, second, and third temperature sensors 220, 230, and/or 240 can be modular, similar to a Secure Digital (SD) memory card, and inserted into slots around and/or within the user device 100 based on an anticipated climate of use for the user device 100. The first, second, and third temperature sensors 220, 230, and 240 can be one or more of a thermistor, thermocouple, resistance thermometer, silicon bandgap temperature sensor, and/or any other sensor that is able to sense temperature.

In one or more embodiments, one or more of the first, second, and third temperature sensors 220, 230, and 240 can be an existing temperature sensor within the user device 100 that measures temperatures of, for example the controller 120, the transceiver 150, the memory 170, and/or any other electrical component within the user device 100 that may be monitored for temperature. The temperature of the first, second, and third batteries 192, 194, and 196 can be extrapolated from a temperature sensor measuring a temperature of such other electrical component(s). In one or more embodiments, the switching logic controller 110 can receive the temperature of the first, second, and third batteries 192, 194, and 196 from one or more Android application PacKages (APKs) running on the user device 100 and/or from a look-up table. In one or more embodiments, the user device 100 can rely on the APKs and/or the look-up table to eliminate the need for the first, second, and third temperature sensors 220, 230, and 240.

In one or more embodiments, the user device 100 can predict a temperature of one or more of the first, second and/or third batteries 192, 194, and 196 based on Global Positioning System (GPS) location information. The user device 100 can retrieve temperature data, for example from the Internet, using the GPS location information as a basis for querying a temperature database from a weather service. Temperature data from this temperature database can be used by the switching logic controller 110 as a basis for at least one of controlling simultaneous charging and/or individual discharging of the first, second, and/or third batteries 192, 194, and 196.

The state of charge determiner 210 can determine a state of charge of the first, second and third batteries 192, 194, and 196. The state of charge determiner 210 can determine a battery and/or cell remaining capacity state of charge using any number of methods, for example tracking of prior usage, coulombic counter during battery discharging, tabularized means for accounting of discharge timing, Specific Gravity (SG) measurements, voltage based state of charge estimation, current based state of charge estimation, internal impedance measurements, a current-temperature lookup table, or any other method that allows a determination of a state of charge of the first, second and/or third batteries 192, 194, and 196.

The switching logic controller 110 can selectively charge and/or discharge the first, second, and/or third batteries 192, 194, and 196 based on a state of charge of the first, second, and/or third batteries 192, 194, and 196. For example, when the state of charge determiner 210 determines that the first battery 192 is fully charged, the switching logic controller 110 can simultaneously charge the second and third batteries 194 and 196 when a temperature sensed by one or more of the first, second, and third temperature sensors 220, 230, and 240 is above the threshold hot temperature value. Likewise, when the state of charge determiner 210 determines that the second battery 194 is fully or substantially depleted, the switching logic controller 110 can individually initially discharge the first battery 192 and subsequently discharge the third battery 196 when a temperature sensed by one or more of the first, second, and third temperature sensors 220, 230, and 240 is below the threshold cold temperature value.

When a temperature of the first, second, or third batteries 192, 194, and/or 196 is below a threshold cold temperature value, the switching logic controller 110 can connect a single battery anode, either the first, second or third anode 251, 253, or 255 to a load of the user device 100. The switching logic controller 110 can connect a single battery to a load of the user device 100 based on a temperature sensed by one or more of the temperature sensors 220, 230, and/or 240. The switching logic controller 110 can connect the single anode 251, 253, or 255 to the anode terminal 197 of the battery pack 190 when the temperature is below a threshold cold temperature value.

When a temperature of the first, second, and/or third batteries 192, 194, and 196, as sensed by one or more of the temperature sensors 220, 230, and/or 240, is above a threshold hot temperature value, the switching logic controller 110 can connect together in parallel all anodes 251, 253, and 255 of the first, second, and third batteries 192, 194, and 196 to the user device 100. During charging of the first, second, and third batteries 192, 194, and 196, equal charging currents can self-generate approximately equal amounts of heat within the first, second, and third batteries 192, 194, and 196. The battery pack 190 with equal heat distribution or nearly equal heat distribution can transfer thermal energy to surrounding areas in a more efficient manner than if first, second, and third batteries 192, 194, and 196 were individually charged.

In one or more embodiments, the switching logic controller 110 can switchably connect a pair from the first, second, and third batteries 192, 194, and 196 to be charged based on a temperature of the first, second, and third batteries 192, 194, and 196 as sensed by one or more of the temperature sensors 220, 230, and/or 240. Charging a pair of batteries from the first, second, and third batteries 192, 194, and 196 can distribute heat generated by charging over a larger mass than can be achieved with individual charging of the first, second, and third batteries 192, 194, and 196, lowering heat generated in the larger mass. The switching logic controller 110 can control charging of a third battery outside of the pair when a temperature sensed by one or more of the temperature sensors 220, 230, and 240 falls below the threshold hot temperature value.

For example, the second battery 194 may be positioned within the user device 100 near an electrical component, such as the controller 120 that can become extremely hot during operation of the user device 100. The temperature sensor 230 of the second battery 194 can sense a temperature at or near the second battery 194 is higher than a threshold hot temperature value. In such an instance, the switching logic controller 110 may disable charging of only the second battery 194 to prevent the second battery 194 from overheating, the transceiver 150 from overheating, and/or the user device 100 from overheating. The switching logic controller 110 can connect the anodes 251 and 255 of the first and third batteries 192 and 196 to the anode terminal 197 of the battery pack 190 for simultaneous charging of only the first and third batteries 192 and 196. In one or more embodiments, a clock speed of the controller 120 can be reduced to reduce heat generated by the controller 120 in one or more of the first, second, and third batteries 192, 194, and 196 when the first, second, and/or third temperature sensors 220, 230, and 240 senses that the controller 120 is overly heating a particular battery.

In one or more embodiments, the first, second, and/or third temperature sensors 220, 230, and 240 can sense that a particular location within the user device 110 is particularly cold and below a threshold temperature. This particularly cold location may be near the third battery 196. The switching logic controller 110 can exclude the third battery 196 from being charged and/or discharged based on a temperature of the third battery 196 being below the threshold temperature value, to prevent damage to the third battery 196 while charging and/or discharging. Additionally, the switching logic controller 110 may select the first battery 192 that is optimized to produce power at temperatures below 0° C. as a sole source of power for the user device 100 when a temperature sensed by one or more of the temperatures sensors 220, 230, and 240 is below 0° C. Likewise, the switching logic controller 110 may select the third battery 196 that is optimized to produce power at temperatures above 45° C. as a sole source of power for the user device 100 when a temperature sensed by one or more of the temperatures sensors 220, 230, and 240 is above 45° C.

Figure 3:
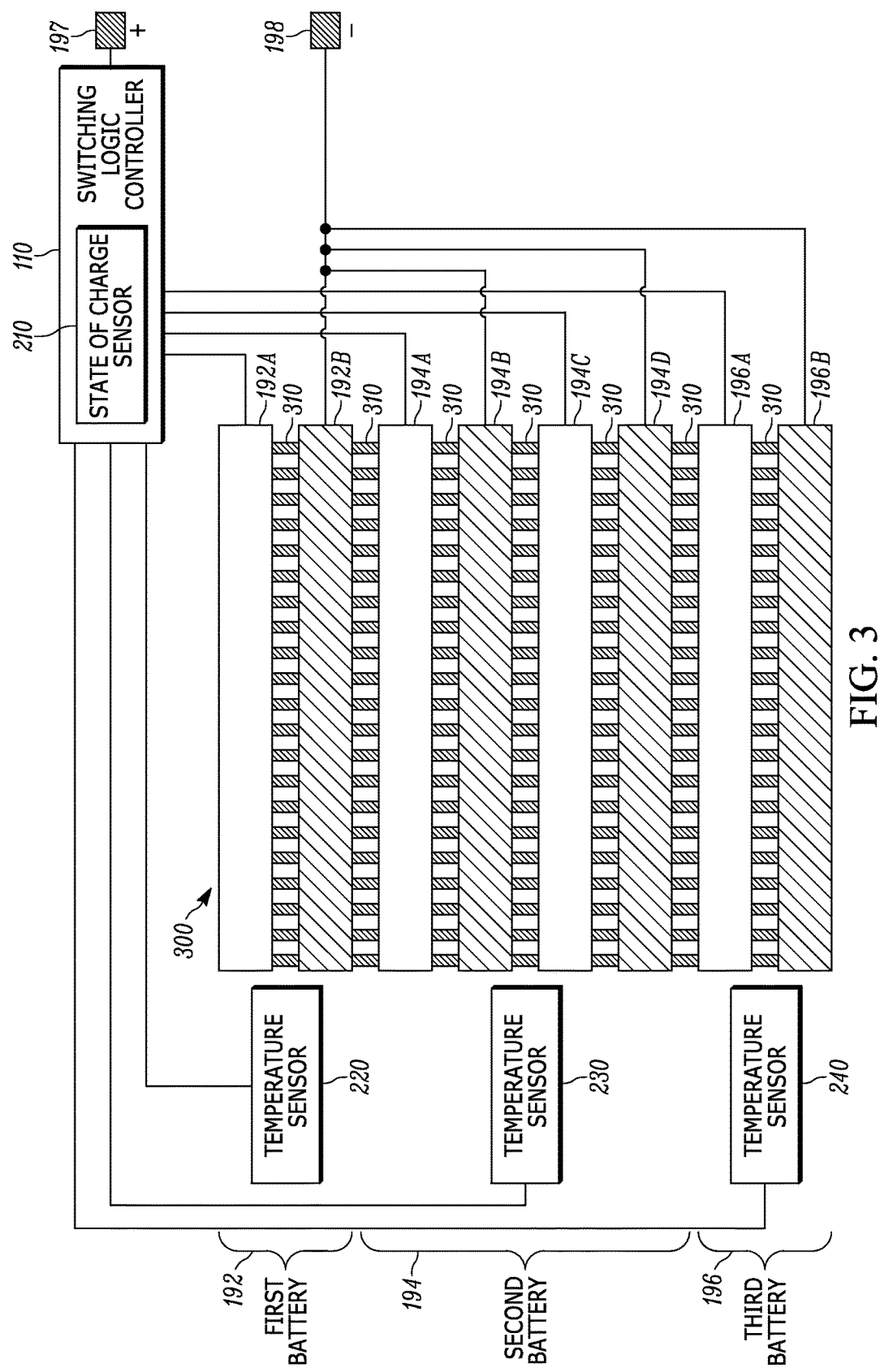
FIG. 3 illustrates an example anode-separator-cathode stack implementation of the battery pack shown in FIG. 1, according to a possible embodiment.

FIG. 3 illustrates an example anode-separator-cathode stack 300 implementation of the battery pack 190, according to a possible embodiment. Typical Li-ion batteries and/or cells demonstrate a high internal resistance under cold operating conditions. For this reason, the user device 100 can utilize battery division into multiple cells that provide advantages over a single cell battery.

The battery pack 190 can be configured as an anode-separator-cathode stack 300. The anode-separator-cathode stack 300 can take the form of a jelly-roll, a flattened roll, or simply an individual laminated stack. Each cell can be an independent battery. The cells may be non-identical. Facility can be made to connect all anodes in one positive bussbar and similarly all cathodes into one negative bussbar. The anode-separator-cathode stack 300 can be configured as one thermal mass. When a battery and/or cell within the battery pack 190 is charged or discharged, the battery can produce some waste heat that warms up the battery. The temperature rise of this battery and/or cell is inversely proportional to its thermal mass. In anticipation that a battery and/or cell will be required to provide energy under cold conditions, an advantage can be realized to keep that same battery and/or cell warmer for improved lower internal resistances. Not all batteries or cells are required to be kept warm, only one or more individual batteries and/or cells that are needed to power the user device 100.

The anode-separator-cathode stack 300 can include Lithium-Ion Polymer (LIP) cells with cut-stacked electrodes. The first battery 192 can include an anode 192a and a cathode 192b, the anode 192a and the cathode 192b constituting a battery cell. The second battery 194 can include two battery cells. The first battery cell of the second battery 194 can include anode 194a and a cathode 194b, the second battery cell of the second battery 194 can include an anode 194c and a cathode 194d. The third battery 196 can include an anode 196a and a cathode 196b, the anode 196a and the cathode 196b constituting a battery cell. Although the first battery 192 is illustrated as including one cell, the second battery 194 as including two cells, and the third battery 196 as including one cell, the number of cells that may be included in the first, second, and third batteries 192, 194, and 196 is dependent upon the configuration and power requirements of the user device 100, and can vary accordingly.

The anode 192a of the first battery 192 can be separated from the cathode 192b of the first battery 192 by a separator 310. Likewise, the anode 194a of the second battery 194 can be separated from the cathode 194b of the second battery 194 by the separator 310, the anode 194c of the second battery 194 can be separated from the cathode 194d of the second battery 194 by the separator 310. The anode 196a of the third battery 196 can be separated from the cathode 196b of the third battery 196 by the separator 310. The cathode 192b of the first battery 192 can be separated from the anode 194a of the second battery 194 by the separator 310. Likewise, the cathode 194d of the second battery 194 can be separated from the anode 196a of the third battery 196 by the separator 310.

The anodes 192a, 194a, 194c, and 196a can be coupled to the switching logic controller 110. The cathodes 192b, 194b, 194d, and 196b can be coupled to the cathode terminal 198 of the battery pack 190. In at least one embodiment, the switching logic controller 110, the state of charge determiner 210, and/or one or more of the temperature sensors 220, 230, and 240 can be located between the first, second, and third batteries 192, 194, and 196. For example, the switching logic controller 110, the state of charge determiner 210, and/or one or more of the temperature sensors 220, 230, and 240 can be located between cathode 192b of the first battery 192 and the anode 194a of the second battery 194. In at least one embodiment, the switching logic controller 110, the state of charge determiner 210, and/or one or more of the temperature sensors 220, 230, and 240 can be located between a cathode and an anode of a same cell of the first, second, and third batteries 192, 194, and 196. For example, the switching logic controller 110, the state of charge determiner 210, and/or one or more of the temperature sensors 220, 230, and 240 can be located between the cathode 194b and the anode 194c of the second battery 194.

The schematic block diagrams illustrated in FIGS. 2 and 3 comprise representations where the cathodes (negative terminals) are tied together and the anode connections are individually controlled. However, in an alternate embodiment the anodes can be tied together with individual control of the cathode connections, working equally as well. For example, the switching logic controller 110 can instead be coupled to the cathode terminals 252, 254, and 256 of the first, second, and third batteries 192, 194, and 196, respectively. In such an embodiment, the switching logic controller 110 can couple the cathode terminal 252 of the first battery 192 and the cathode terminal 198 of the battery pack 190, couple the cathode terminal 254 of the second battery 194 and the cathode terminal 198 of the battery pack 190, and/or couple the cathode terminal 256 of the third battery 196 and the cathode terminal 198 of the battery pack 190.

Figure 4:
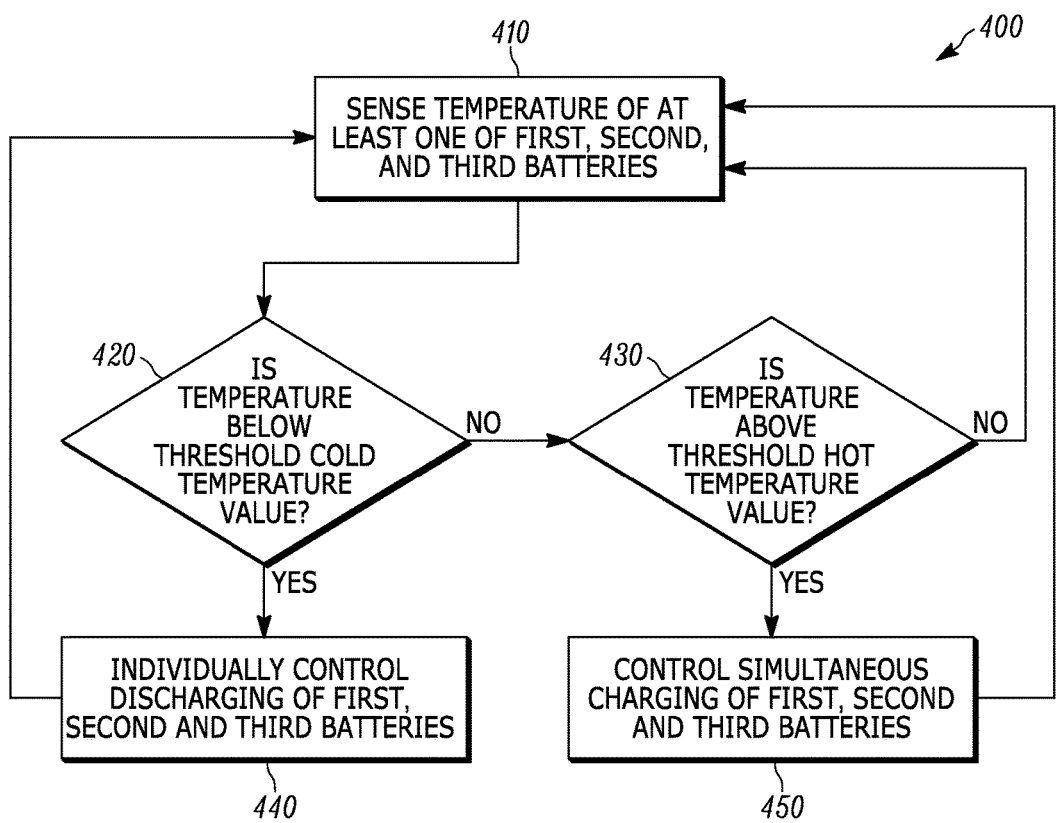
FIG. 4 illustrates an example flowchart of a method of controlling charging and/or discharging batteries of the user device, according to a possible embodiment.

FIG. 4 illustrates an example flowchart of a method 400 of controlling charging and/or discharging batteries of the user device 100, according to a possible embodiment.

At block 410, the method 400 can begin by sensing, with one or more of the first, second, and third temperature sensors 220, 230, and 240 temperatures of the first, second, and/or third batteries 192, 194, and 196, respectively. The switching logic controller 110 can receive an electrical signal providing a temperature from one or more of the first, second, and third temperature sensors 220, 230, and 240. Block 410 can proceed to block 420.

At block 420, the method 400 can determine if the temperature of one or more of the first, second, and/or third batteries 192, 194, and 196 is below the threshold cold temperature value. The switching logic controller 110 can compare the temperature sensed in block 410 to pre-stored thresholds. The switching logic controller 110 can determine if the temperature sensed in block 410 is below the threshold cold temperature value. If the temperature of the first, second, and/or third batteries 192, 194, and 196 is below the threshold cold temperature value, block 420 can branch to block 440. If the temperature of the first, second, and third batteries 192, 194, and/or 196 is not below the threshold cold temperature value, block 420 can branch to block 430.

At block 440, the method 400 can control discharging. The switching logic controller 110, in response to the determination that the temperature of the first, second, and/or third batteries 192, 194, and 196 is below the threshold cold temperature value in block 420, can individually control discharging of the first, second, and/or third batteries 192, 194, and 196. For example, the switching logic controller 110 can couple only the first battery 192 to a load of the user device 100. Once the first battery 192 is depleted or substantially depleted, the switching logic controller 110 can subsequently couple the second battery 194 to power the user device 100. Once the second battery 194 is depleted or substantially depleted, the switching logic controller 110 can subsequently couple the third battery 196. Block 440 can proceed to block 410 to allow the method 400 to continue to sense a temperature of the first, second, and/or third batteries 192, 194, and 196.

At block 430, the method 400 can determine if the temperature of the first, second, and/or third batteries 192, 194, and 196 is above the threshold hot temperature value. The switching logic controller 110 can receive temperature information from the first, second, and/or third temperature sensors 220, 230, and 240. If the temperature of the first, second, and/or third batteries 192, 194, and 196 is above the threshold hot temperature value, block 430 can branch to block 450. If the temperature of the first, second, and/or third batteries 192, 194, and 196 is not above the threshold hot temperature value, block 430 can branch to block 410 to allow the method 400 to continue to sense a temperature of the first, second, and/or third batteries 192, 194, and 196.

At block 450, the method 400 can control simultaneous charging. The switching logic controller 110 can simultaneously couple the first, second, and third batteries 192, 194, and 196 to the user device 100. The first, second, and third batteries 192, 194, and 196 can then be charged in parallel. Block 450 can proceed to block 410 to continue to sense a temperature of the first, second, and/or third batteries 192, 194, and 196.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A user device, comprising:
a first battery that powers the user device;
a second battery that powers the user device; and
a switching logic controller that simultaneously charges the first and second batteries based on a temperature of at least one of the first and second batteries being above a threshold temperature that damages at least one of the first and second batteries and individually discharges one of the first and second batteries based on the temperature of at least one of the first and second batteries being below a threshold temperature.

2. The user device according to claim 1, further comprising:
a temperature sensor configured to sense the temperature of at least one of the first and the second batteries,
wherein the switching logic controller is configured to control the simultaneous charging and control the individual discharging based on the temperature sensed by the temperature sensor.

3. The user device according to claim 1, further comprising:
a state of charge determiner to determine a state of charge of at least one of the first and second batteries,
wherein the switching logic controller is further configured to switchably de-couple the first battery from discharging when the first battery is determined to be depleted by the state of charge determiner and configured to switchably couple the second battery to discharge when the first battery is determined to be depleted by the state of charge determiner.

4. The user device according to claim 1, further comprising:
a battery pack comprising the first and second batteries,
wherein the switching logic controller is embedded within the battery pack.

5. The user device according to claim 1, further comprising:
a battery pack comprising an anode terminal,
wherein the switching logic controller selectively couples the anode terminal of the battery pack to each of the first and second batteries based on the temperature of at least one of the first and second batteries.

6. The user device according to claim 1, further comprising:
a third battery configured to power the user device,
wherein the switching logic controller is further configured to control charging of the first and second batteries as a pair while separately controlling charging of the third battery individually based on the temperature of at least one of the first, second, and third batteries.

7. The user device according to claim 1, wherein the first battery is optimized over the second battery to produce power at temperatures below a threshold cold temperature value.

8. The user device according to claim 1, wherein the switching logic controller simultaneously chargers the first and second batteries when a temperature of at least one of the first and second batteries is above a threshold hot temperature value and individually dischargers one of the first and second batteries when a temperature of at least one of the first and second batteries is below the threshold hot temperature value.

9. The user device according to claim 1, further comprising:
a state of charge determiner to determine a state of charge of at least one of the first and second batteries,
wherein the switching logic controller further controls at least one of the simultaneous charging and the individual discharging based on the state of charge of at least one of the first and second batteries.

10. The user device according to claim 1, wherein the user device is a cellular telephone.

11. A method, comprising:
powering, with a first battery, a user device;
powering, with a second battery, the user device; and
simultaneously charging of the first and second batteries based on a temperature of at least one of the first and second batteries being above a threshold temperature that damages at least one of the first and second batteries; and
individually discharging one of the first and second batteries based on the temperature of at least one of the first and second batteries being below a threshold temperature.

12. The method according to claim 11, further comprising:
sensing the temperature of at least one of the first and the second batteries; and
controlling at least one of the simultaneous charging and the individual discharging based on the temperature sensed by the temperature sensor.

13. The method according to claim 11, further comprising:
switchably de-coupling the first battery from discharging when the first battery is determined to be depleted; and
switchably coupling the second battery to discharge when the first battery is determined to be depleted.

14. The method according to claim 11, further comprising embedding within a battery pack the first and second batteries.

15. The method according to claim 11, further comprising coupling an anode terminal of a battery pack to each of the first and second batteries based on the temperature of at least one of the first and second batteries.

16. The method according to claim 11, further comprising:
controlling charging of the first and second batteries as a pair while separately controlling charging of a third battery based on the temperature of at least one of the first, second, and third batteries.

17. The method according to claim 11, further comprising:
optimizing the first battery over the second battery to produce power at temperatures below a threshold cold temperature value.

18. The method according to claim 11, further comprising:
the wherein simultaneously charging comprises simultaneously charging the first and second batteries when a temperature of at least one of the first and second batteries is above a threshold temperature that damages at least one of the first and second batteries,
wherein the method comprises individually charging of the first and second batteries when a temperature of at least one of the first and second batteries is below the threshold temperature that damages at least one of the first and second batteries.

19. The method according to claim 11, further comprising:

determining a state of charge of the first and second batteries; and controlling at least one of the simultaneous charging and the individual discharging based on the state of charge of the first and second batteries.

20. The user device according to claim 1, wherein the first battery produces more heat than the second battery and the switching logic controller selects the first battery for discharging based on the temperature of at least one of the first and second batteries being below a threshold temperature.

* * * * *